United States Patent
Yamamoto et al.

(10) Patent No.: US 6,610,818 B2
(45) Date of Patent: Aug. 26, 2003

(54) PROCESS FOR PRODUCING AMINO RESIN PARTICLES

(75) Inventors: Yasuhiro Yamamoto, Himeji (JP); Shuji Shimizu, Himeji (JP); Masafumi Inoue, Himeji (JP); Hideki Oishi, Himeji (JP)

(73) Assignee: Nippon Shokubai, Co., Ltd., Osaka (JP)

( * ) Notice: Subject to any disclaimer, the term of this patent is extended or adjusted under 35 U.S.C. 154(b) by 0 days.

(21) Appl. No.: 10/034,089

(22) Filed: Dec. 28, 2001

(65) Prior Publication Data

US 2002/0137876 A1 Sep. 26, 2002

(30) Foreign Application Priority Data

Dec. 28, 2000 (JP) .......................................... 2000-402022
Mar. 30, 2001 (JP) .......................................... 2001-099413

(51) Int. Cl.$^7$ .............................. C08J 5/10; C08K 3/04; C08L 61/26
(52) U.S. Cl. ...................... 528/480; 528/490; 528/492; 528/498; 528/499; 528/502 A; 528/502 F; 523/205; 523/208; 524/495; 524/597
(58) Field of Search ........................ 528/502 A, 502 F, 528/491, 499, 492, 480, 490; 523/205, 208; 524/495, 597

(56) References Cited

U.S. PATENT DOCUMENTS

| | | | |
|---|---|---|---|
| 3,945,980 A | | 3/1976 | Tsubakimoto et al. ..... 260/39 P |
| 4,069,176 A | * | 1/1978 | Tsubakimoto et al. ...... 523/333 |
| 4,360,611 A | | 11/1982 | Wakimoto et al. .......... 523/216 |
| 4,371,642 A | | 2/1983 | Jaffe |
| 4,939,189 A | * | 7/1990 | Tobinaga et al. ............ 523/205 |
| 5,288,790 A | * | 2/1994 | Nakahara et al. ........... 524/495 |
| 5,559,168 A | * | 9/1996 | Mori et al. .................. 523/205 |

FOREIGN PATENT DOCUMENTS

| | | |
|---|---|---|
| JP | 56-42614 | 10/1981 |
| JP | 62-068811 * | 3/1987 |
| JP | 63010671 | 1/1988 |
| JP | 04211450 | 8/1992 |
| JP | 8-337880 | 12/1996 |
| JP | 11-021355 | 1/1999 |

* cited by examiner

*Primary Examiner*—P. Hampton-Hightower
(74) *Attorney, Agent, or Firm*—David G. Conlin; John B. Alexander; Edwards & Angell, LLP

(57) ABSTRACT

A process for producing amino resin particles includes: a reaction process for obtaining a reaction solution containing an amino resin precursor which is obtained by a reaction of an amino compound with formaldehyde, and having a viscosity in a range of from $2 \times 10^{-2}$ Pa·s to $5.8 \times 10^{-2}$ Pa·s at a temperature in a range of from 95° C. to 98° C.; an emulsion process for obtaining an emulsion by emulsifying the reaction solution; and a curing process for curing the amino resin precursor in the emulsion state by adding a catalyst to the emulsion. With this producing process, it is possible to readily produce amino resin particles with an essentially uniform particle size (narrow particle size distribution). Further, with use of an aqueous dispersion of an inorganic pigment which is obtained by wet pulverizing the inorganic pigment in an aqueous medium until the average particle size of the inorganic pigment measured by a light scattering method becomes not more than 300 nm, it is possible to obtain amino resin particles with superior properties in coloring strength, visibility, heat resistance, solvent resistance, and chemicals resistance.

17 Claims, No Drawings

PROCESS FOR PRODUCING AMINO RESIN PARTICLES

FIELD OF THE INVENTION

The present invention relates to a process for producing amino resin particles which are suitable for, for example, abrasives, flatting agents, light diffusing agents, and coating agents for various films; or fillers for polyolefin, polyvinyl chloride, various rubbers, coatings, and toners; or rheology control agents; or a coloring agents for toners and carriers of electrostatic copiers, digital paper, cosmetics, inks, plastics, fibers, rubbers, and the like.

BACKGROUND OF THE INVENTION

One conventional process for producing amino resin particles employs a reaction of amino compounds with formaldehyde and curing of the amino resin precursor, which is the product of this reaction. For example, Japanese Unexamined Patent Publication No. 57091/1974 (*Tokukaisho* 49-57091) (published date: Jun. 3, 1974) discloses a method for controlling the reaction of amino compounds with formaldehyde by finding the end point of this reaction by measuring miscibility with acetone.

However, the conventional process which measures miscibility with acetone in producing amino resin particles is associated with some problems, including the problem of a long measurement time and a large measurement error of ±15%, which makes it difficult to obtain amino resin particles of an essentially uniform particle size (narrow particle size distribution).

Meanwhile, amino resin particles have been used as colored resin particles by adding dyes or pigment. Generally, the colored resin particles, which are made from various matrix resins, have been widely used in a variety of ways in various applications, such as in plastics, dyes, inks, cosmetics, and the like. The amino resin particles generally include a dye or a pigment which becomes parts of the resin component. The dye or the pigment is used in this way to make up the resin, instead of by itself, to improve affinity for polymers, such as coatings, inks, plastics, fibers, and rubbers. Further, the colored resin particles can have an improved fluidity during preparation and processing when the particles are in the form of a sphere, compared with a non-sphere. Further, the use of the colored resin particles in coatings and fibers, etc., is advantageous because it improves the smoothness of a surface coated with the colored resin particles. This makes it possible to increase the volume of fills.

However, while the colored resin particles which are obtained by mixing a thermosetting resin such as a phenol resin and an epoxy resin, or a thermoplastic resin such as an acrylic resin or a vinyl resin with an organic dye or organic pigment have superior visibility and coloring strength, they are generally inferior when it comes to heat resistance, color resistance, solvent resistance, weather resistance, and bleed resistance, etc.

On the other hand, the colored resin particles which are colored by an inorganic pigment are more superior than those which are colored by an organic dye in terms of solvent resistance, color resistance, weather resistance, and bleed resistance, and are more superior than those which are colored by an organic pigment in terms of color resistance and heat resistance.

Examples of the colored resin particles which incorporate a pigment to color the thermoplastic resin are found, for example, in Japanese Unexamined Patent Publication No. 17169/1983 (*Tokukaisho* 58-17169) (published date: Feb. 1, 1983) which discloses the colored resin particles which are obtained by mixing and pulverizing a thermoplastic resin and a pigment, in Japanese Examined Patent Publication No. 22324/1982 (*Tokukousho* 57-22324) (published date: May 12, 1982) which discloses colored resin spherical particles which are obtained by adding a pigment during a reaction such as suspension polymerization, and in Japanese Unexamined Patent Publication No. 10671/1988 (*Tokukaisho* 63-10671) (published date: Jan. 18, 1988) which discloses colored resin spherical particles which are obtained by coating a pigment after chemical or physical treatment on the surface of thermoplastic resin particles.

Further, one example of the colored resin particles which incorporate a pigment to color the thermosetting resin is the colored thermosetting resin spherical particles which are obtained by adding a pigment during a polyaddition or addition condensation reaction of the thermosetting resin, such as a phenol resin or an epoxy resin.

However, the conventional colored resin particles which use the thermoplastic resin as exemplified above have the problem of poor heat resistance, poor solvent resistance, and poor chemicals resistance, the problem of poor dispersibity and poor adhesiveness of the pigment in the resin particles, and the problem of poor surface smoothness of the colored particles.

Further, the conventional colored resin particles which use the thermosetting resin as exemplified above have a problem that the dispersibity of the inorganic pigment in the particles is poor, in addition to the problem of weak coloring strength and poor visibility. Further, the particle size distribution is wide, and the particles are not in the form of a fine sphere, in addition to being fragile. Thus, depending on the use, an additional process such as classification will be required, which possesses the problem of increased cost, for example.

SUMMARY OF THE INVENTION

The first object of the present invention is to provide a process for conveniently producing amino resin particles with an essentially uniform particle size (narrow particle size distribution).

In order to achieve this object, a process for producing amino resin particles according to the present invention includes: a reaction process for obtaining a reaction solution containing an amino resin precursor which is obtained by a reaction of 1.2 moles to 3.5 moles of formaldehyde with 1 mole of an amino compound, and having a viscosity of $2 \times 10^{-2}$ Pa·s to $5.8 \times 10^{-2}$ Pa·s at 95° C. to 98° C.; an emulsion process for obtaining an emulsion by emulsifying the above described reaction solution; and a curing process for curing the amino resin precursor in an emulsion state by adding a catalyst in the emulsion.

With this process, it is possible to grasp, in real time monitoring, how far the reaction of the amino compound with formaldehyde in the reaction process has proceeded, and to accurately find the end point of the reaction. That is, by adjusting and controlling the viscosity of the reaction solution within the range of from $2 \times 10^{-2}$ Pa·s to $5.8 \times 10^{-2}$ Pa·s (20 c.p. to 58 c.p.), the end point of the reaction between the amino compound and formaldehyde can be accurately found, thereby controlling the particle size of the product amino resin particles with ease. As a result, it is possible to conveniently produce amino resin particles with an essentially uniform particle size (narrow particle size distribution). Further, by the essentially uniform particle size, the particles can have the same color tone, for example, when the amino resin particles are colored.

The second object of the present invention is to provide an industrially advantageous process, in terms of durability and coloring strength, for producing amino resin particles (colored resin particles) in the form of spherical fine particles, with superior dispersibility of an inorganic pigment contained in the colored resin particles and with superior properties in coloring strength, visibility, heat resistance, solvent resistance, and chemicals resistance.

In order to achieve this object, another process for producing amino resin particles according to the present invention includes: a preparation process for preparing an aqueous dispersion of an inorganic pigment by wet pulverizing the inorganic pigment in an aqueous medium until an average particle size of the inorganic pigment measured by a light scattering method becomes not more than 300 nm; a coloring process for obtaining a colored resin solution by mixing the aqueous dispersion with an amino resin precursor; a dispersion process for obtaining a colored resin dispersion by emulsifying or suspending the colored resin solution in an aqueous medium; and a curing process for curing the colored resin dispersion by heating the colored resin dispersion to condense.

According to this process, the amino resin precursor is mixed with an aqueous dispersion of the inorganic pigment which is prepared by wet pulverizing the inorganic pigment in an aqueous medium until an average particle size of the inorganic pigment measured by a light scattering method becomes not more than 300 nm. Amino resin particles with superior properties in coloring strength, visibility, heat resistance, solvent resistance, and chemicals resistance can be obtained by filtering out the mixture, which is obtained as a colored resin solution.

Further, amino resin particles with more superior properties in coloring strength, visibility, heat resistance, solvent resistance, and chemicals resistance can be obtained by including a surfactant in the aqueous medium.

For a fuller understanding of the nature and advantages of the invention, reference should be made to the ensuing detailed description.

DESCRIPTION OF THE EMBODIMENTS

[First Embodiment]

The following will describe one embodiment of the present invention. A process for producing amino resin particles according to the present invention includes: a reaction process for obtaining a reaction solution containing an amino resin precursor which is obtained by a reaction of 1.2 moles to 3.5 moles of formaldehyde with 1 mole of an amino compound, and having a viscosity of $2 \times 10^{-2}$ Pa·s to $5.8 \times 10^{-2}$ Pa·s at 95° C. to 98° C.; an emulsion process for obtaining an emulsion by emulsifying the reaction solution; and a curing process for curing the amino resin precursor in an emulsion state, by adding a catalyst in the emulsion, so as to promote a dehydration and condensation reaction at methylol groups of the amino resin precursor.

The amino compound may be any amino-containing compound which includes at least one amino group in the molecule. Specific examples of such amino compounds include, but not limited to, benzoguanamine (2,4-diamino-6-phenyl-sym.-triazine), cyclohexane carboguanamine, cyclohexene carboguanamine, melamine, paratoluenesulfonamide, urea, and norbornane carboguanamine, norbornene carboguanamine. Of these amino compounds, benzoguanamine, cyclohexane carboguanamine, cyclohexene carboguanamine, and melamin are preferable. These amino compounds may be used individually or in combination of two or more kinds. However, it is preferable that at least one compound selected from this group of amino compounds is contained in the amount of not less than 40 percent by weight and not more than 100 percent by weight with respect to the total amount of the amino compound which is used in this reaction solution.

The solvent used in the reaction of the amino compound with formaldehyde is water. Thus, the formaldehyde may be added (charged), for example, in the form of an aqueous solution (formalin), or may be generated in the reaction solution by adding trioxane or paraformaldehyde in water. Of these two methods, the former method of adding formaldehyde in the form of an aqueous solution is more preferable.

The proportion of formaldehyde with respect to 1 mole of the amino compound is preferably in the range of 1.2 moles to 3.5 moles, more preferably 1.5 moles to 3.0 moles, and still more preferably 2.0 moles to 3.0 moles. A proportion of formaldehyde outside these ranges may increase the unreacted portion of the amino compound or formaldehyde. Note that, the amount of the amino compound and formaldehyde added to water, i.e., the concentration of the amino compound and formaldehyde in water when they are charged into a reactor should preferably be as high as possible but only to the level which does not have negative influence on the reaction. Specifically, the concentration is set so that the viscosity of the reaction product, the amino resin precursor, at a temperature from 95° C. to 98° C. is adjusted or controlled within the range of $2 \times 10^{-2}$ Pa·s to $5.8 \times 10^{-2}$ Pa·s (20 c.p. to 58 c.p. (centipoise)), or more preferably $2 \times 10^{-2}$ Pa·s to $5.5 \times 10^{-2}$ Pa·s (20 c.p. to 55 c.p.). More preferably, the concentration is set so that the concentration of the amino resin precursor falls within the range of from 30 percent by weight to 60 percent by weight when the reaction solution is added to the aqueous solution of the emulsifier in the emulsion process. More specifically, the sum amount of the reaction substrate, the amino compound and formaldehyde, with respect to the sum amount of the reaction solvent and the reaction substrate, that is, the sum concentration of the amino compound and formaldehyde when they are charged into the reactor is preferably in the range of from 50 percent by weight to 80 percent by weight, or more preferably 60 percent by weight to 75 percent by weight.

The viscosity can be measured by any method. However, in order to grasp, in real time monitoring, how far the reaction has proceeded, and to accurately find the end point of the reaction, a viscosity measuring device is most suitably be used. A specific example of such a viscosity measuring device is the oscillation viscometer (product of MIVI ITS Japan Co., Ltd., model MIVI 6001). This viscometer is equipped with an oscillator which oscillates in the reaction solution to detect a load which is applied in response to increased viscosity of the reaction solution. The viscometer instantly converts this load to display the current viscosity. The use of a reaction vessel equipped with such an oscillation viscometer is preferable in the reaction of the amino resin precursor of the present invention.

It is preferable that the pH of the reaction solution is adjusted, for example, using sodium carbonate, sodium hydroxide, potassium hydroxide, or ammonium water, so that the solution becomes a neutral solution or weak alkaline solution. The amount of sodium carbonate used is not particularly limited. The reaction of the amino compound with formaldehyde in water produces a precursor of amino resin, the initial condensation product. The reaction temperature is not particularly limited either. However, in order to grasp how far the reaction has proceeded and to accurately find the end point of the reaction, a reaction temperature in the range of from 95° C. to 98° C. is preferable. The reaction process is finished, for example, by cooling the reaction solution when the viscosity of the reaction solution falls in the range of $2 \times 10^{-2}$ Pa·s to $5.8 \times 10^{-2}$ Pa·s. The end result of the reaction process is a reaction solution containing a precursor of amino resin. Therefore, the reaction time is not particularly limited.

The precursor of amino resin so obtained may be converted to an ether using an alcohol, for example. In the present embodiment, the precursor of amino resin is preferably obtained by the reaction of the amino compound with formaldehyde, wherein the amino compound is at least one compound selected from the group consisting of benzoguanamine, cyclohexane carboguanamine, cyclohexene carboguanamine, and melamine, which is contained in an amount in the range of from 40 percent by weight to 100 percent by weight. In addition, the precursor of amino resin may be converted to an ether.

The viscosity of the reaction solution at the end of the reaction is significantly higher than that of the initial aqueous solution which contained the amino compound and formaldehyde at the start of the reaction. Therefore, the concentration of the raw materials used in the reaction has negligible effect on the viscosity of the final reaction solution. The precursor of amino resin is soluble in organic solvents such as acetone, dioxane, methyl alcohol, ethyl alcohol, isopropyl alcohol, butyl alcohol, ethyl acetate, butyl acetate, methyl cellosolve, ethyl cellosolve, methyl ethyl ketone, toluene, and xylene, whereas it is practically insoluble in water.

As a rule, the lower the viscosity of the reaction solution, the smaller the particle size of the product particles. However, a viscosity of the reaction solution below $2 \times 10^{-2}$ Pa·s or above $5.8 \times 10^{-2}$ Pa·s fails to obtain amino resin particles with an essentially uniform particle size (narrow particle size distribution). That is, a viscosity of the reaction solution below $2 \times 10^{-2}$ Pa·s (20 c.p.) causes instability in the emulsion obtained in the emulsion process. In this case, curing of the amino resin precursor in the curing process produces large amino resin particles, or aggregation of the particles. That is, the particle size of the amino resin particles cannot be controlled, with the result that the amino resin particles cannot be obtained in a uniform particle size (wide particle size distribution). Further, since the emulsion is instable, the particle size of the amino resin particles becomes different every time they are produced (batched). As a result, uniformity of the products cannot be ensured. On the other hand, a viscosity of the reaction solution above $5.8 \times 10^{-2}$ Pa·s (58 c.p.) puts a load, for example, on a rapid stirrer rotating at high speed in the emulsion process. This results in a weaker shearing force, which makes it difficult to stir (emulsify) the reaction solution sufficiently. That is, the particle size of the amino resin particles cannot be controlled, with the result that the amino resin particles cannot be obtained in a uniform particle size (wide particle size distribution).

The reaction solution is emulsified to obtain the emulsion. Specific examples of the emulsifier to form a protective colloid include polyvinyl alcohol, carboxymethyl cellulose, sodium alginate, polyacrylic acid, aqueous polyacrylate, polyvinylpyrrolidone, alkali metal salts of polyacrylic acid, and alkali metal salts of styrene-maleic acid co-polymer. These emulsifiers are used in the form of an aqueous solution by being entirely dissolved in water, or partially as an aqueous solution and the remaining portion in their original form (e.g., in the form of a powder, granule, and liquid). Of these emulsifiers as exemplified above, considering stability of the emulsion and interaction with the catalyst, polyvinyl alcohol is preferable. The polyvinyl alcohol may be completely saponificated or partially saponificated. Further, the degree of polymerization of polyvinyl alcohol is not particularly limited. As a rule, the larger the amount of emulsifier used with respect to the amino resin precursor, the smaller the particle size of the product particles. The amount of emulsifier used with respect to 100 percent by weight of the amino resin precursor is preferably in the range of from 1 percent by weight to 30 percent by weight, or more preferably 1 percent by weight to 5 percent by weight.

In the emulsion process, the reaction solution is added to the aqueous solution of the emulsifier until the concentration of the amino resin precursor (i.e., concentration of the solid component) falls in the range of from 30 percent by weight to 60 percent by weight, followed by emulsification at a temperature of from 70° C. to 100° C. The concentration of the emulsifier is not particularly limited, provided that it allows the concentration of the amino resin precursor to fall in the foregoing range. It is preferable that the method of stirring the solution in the emulsion process uses a powerful device. Specifically, the method preferably uses a so-called rapid stirrer or homomixer. A concentration of the amino resin precursor less than 30 percent by weight reduces output of the amino resin particles. On the other hand, a concentration of the amino resin precursor more than 60 percent by weight produces large amino resin particles or aggregation of the particles. That is, the particle size of the amino resin particles cannot be controlled, with the result that the amino resin particles cannot be obtained in a uniform particle size (wide particle size distribution).

Further, in the present invention, in order to prevent aggregation of the amino resin particles, inorganic particles may be added to the emulsion as required. Specific examples of inorganic particles include silica particles, zirconia particles, aluminium powder, alumina sol, and ceria sol. The specific surface area (BET specific surface area) of the inorganic particles is preferably from 50 $m^2/g$ to 400 $m^2/g$, and the particle size is preferably not more than 0.05 $\mu$m. With the specific surface area and the particle size in these ranges, aggregation of the amino resin particles can be prevented more effectively.

The inorganic particles may be added to the emulsion, for example, directly in the form of particles, or in the form of a dispersion in water. The amount of inorganic particles added to the emulsion is not particularly limited, but the range of from 1 percent by weight to 15 percent by weight with respect to 100 percent by weight of the amino resin precursor is preferable.

The amino resin particles of the present invention, produced by the reaction of dehydrocondensation taking place at the methylol groups of the amino resin precursor, is obtained by adding a catalyst to the emulsion and by curing the amino resin precursor in the emulsion state. Acids are preferably used as the catalyst (curing catalyst). Specific examples of such acids include, but not limited to, mineral acids such as hydrochloric acid, sulfuric acid, and phosphoric acid; ammonium salts of these mineral acids; sulfamic acid; sulfonic acids such as benzenesulfonic acid, paratoluenesulfonic acid, and dodecylbenzenesulfonic acid; organic acids such as phthalic acid, benzoic acid, acetic acid, propionic acid, and salicylic acid; and ammonium salts such as ammonium chloride and ammonium phosphate. These catalysts may be used individually or in combination of two or more kinds. The amount of catalyst used with respect to 100 percent by weight of the amino resin precursor is preferably in the range of from 0.1 percent by weight to 5 percent by weight. The amount of catalyst exceeding 5 percent by weight disrupts the emulsion state and causes the particles to aggregate. On the other hand, the amount of catalyst less than 0.1 percent by weight results in a long reaction time and incomplete curing.

The reaction temperature is preferably in the range of from 15° C. (ordinary temperature) to 100° C. The end point of the reaction is found by sampling or visual inspection. Thus, a reaction time is not particularly limited. The method of stirring the solution in the curing process preferably uses a powerful device. Specifically, the method preferably uses a so-called a rapid stirrer or homomixer.

Further, in the present invention, the amino resin particles may be colored as required. The amino resin has high affinity for dyes. The dyes used in the present invention may be water-soluble dyes or solvent-soluble dyes, specific examples of which include water-soluble monoazo dyes, water-soluble polyazo dyes, metal-containing azo dyes, disperse azo dyes, anthraquinone acid dyes, anthraquinone vat dyes, indigo dyes, sulfide dyes, phthalocyanine dyes, diphenylmethane dyes, triphenylmethane dyes, nitro dyes, nitroso dyes, thiasol dyes, xanthene dyes, acridine dyes, azine dyes, oxadine dyes, thiazine dyes, benzoquinone dyes, naphthoquinone dyes, and cyanine dyes. Note that, the amino resin may also be colored using a pigment. The pigment is preferably an inorganic pigment. The type and form of the inorganic pigment are not particularly limited, and it may be, for example, titanium oxide, iron oxide, zinc oxide, barium sulfate, calcium sulfate, barium carbonate, calcium carbonate, magnesium carbonate, talc, clay, and carbon black. The dye or pigment may be added in any of the reaction process, emulsion process, and curing process. However, in order to attain uniform color, it is preferable that the dye (pigment) is added to the reaction solution during reacting in the form of a dispersion in water after the reaction solution is emulsified, and it is more preferable that the dye (pigment) is added to the solution in the form of a dispersion in water. Further, it is preferable that the dye (pigment) is added, for example, in the form of a dispersion in water, or as an aqueous solution. Note that, the coloring process for adding the dye in the reaction process and/or emulsion process, and the coloring method using the inorganic pigment will be described later. Note that, a solution or a dispersion of dyes (pigments) is defined by water-solubility of the dyes or pigments. For example, a dye (pigment) solution is obtained by using water soluble dyes (pigments), and a dye (pigment) dispersion is obtained by using non-water soluble dyes (pigments).

The amino resin, which is the thermosetting resin, is obtained by condensing and curing the amino resin precursor. That is, the amino resin particles of the present invention are obtained. The average particle size of the amino resin particles is not particularly limited, and the range of from 1 $\mu$m to 30 $\mu$m is preferable, and the range of from 2 $\mu$m to 5 $\mu$m is more preferable. With the producing process of the present invention, the standard deviation of the particle size can be controlled not to exceed 1.2 $\mu$m (actual lower limit is 0.1 $\mu$m), more preferably 1.1 $\mu$m, and most preferably 0.2 $\mu$m. Note that, the characteristics of the amino resin, such as crosslinkage, average molecular weight, and distribution of molecular weights are not particularly limited.

The method of removing the amino resin particles from the reaction solution is not particularly limited. For example, the amino resin particles can be removed conveniently by filtration, or with the use of a separator such as a centrifugal separator. Note that, the amino resin particles removed from the reaction solution may be washed as required.

The amino resin particles removed in the separation process is dried at a temperature, for example, around 100° C. to 200° C. The drying temperature or drying method is not particularly limited. The drying process is finished when the water content of the amino resin particles becomes not more than 3 percent by weight. Alternatively, in order to further improve, for example, solvent resistance, water resistance, and heat resistance, the amino resin particles removed in the separation process may be subjected to heat treatment, instead of the drying process. The temperature or method of the heat treatment is not particularly limited. After the drying process or heat treatment, the amino resin particles are optionally pulverized (ground) and classified to obtain particles with an average particle size of not more than 10 $\mu$m, i.e., fine particles. Note that, because there is essentially no aggregation of particles in the amino resin particles produced by the process of the present invention, only a small force (load) needs to be applied to pulverize the amino resin particles in case where they are pulverized.

The amino resin particles produced by the process of the present invention have superior properties in solvent resistance, water resistance, and heat resistance, in addition to being hard. Thus, the amino resin particles of the present invention can be suitably used, for example, as a flatting agent, a light diffusing agent, and a coating agent for various films; or a filler for polyolefin (polyethylene, polypropylene), polyvinyl chloride, various rubbers, various coatings, and toners; a rheology control agent, a coloring agent.

The following describes the process for producing the amino resin particles according to the present embodiment, in regard to the coloring process for imparting color to the particles by adding a dye in the reaction process and/or emulsion process.

It is preferable that the process for producing the amino resin particles according to the present embodiment includes a coloring process, subsequent to the reaction process, for adding an aqueous dispersion of a dye in the reaction solution. Further, it is preferable that the process for producing the amino resin particles according to the present embodiment includes, subsequent to the emulsion process, a coloring process for adding an aqueous solution of a dye in the emulsion.

The amino resin precursor or amino resin has superior affinity for dyes. The type of dye added to the reaction solution in the reaction process is not particularly limited as long as it can be dispersed in water, i.e., the solvent-soluble dye. Specific examples of such a solvent-soluble dye include solvent-soluble dyes such as oil orange B, oil blue BA (provided by Chuo Synthetic Chemical Co., Ltd.), azosole brilliant yellow 4GF, azosole fast blue GLA, and oil red TR-71; and disperse dyes such as fast yellow YL, fast blue FG, cellitone pink FF3B, and cellitone pink 3B. These dyes may be used individually or in combination of two or more kinds.

The content of the dye in the dispersion is not particularly limited, and it is preferably in the range of from 1 percent by weight to 50 percent by weight, or more preferably 10 percent by weight to 40 percent by weight. The dye content of less than 1 percent by weight makes the amount of the dispersion added excessive, which may reduce output of the amino resin particles. On the other hand, the dye content above 50 percent by weight reduces fluidity of the dispersion, which makes it difficult to handle the dispersion when it is added, and the addition of the dispersion may become difficult. Further, since the solvent-soluble dyes have poor wettability for water, a dispersion auxiliary may be used as required when dispersing the dye in water. Note that, the method of preparing the aqueous dispersion of a dye, and the method of adding and mixing the dispersion in the reaction solution are not particularly limited.

The reaction solution (solution) after addition of the dispersion is adjusted to a pH in the range of from 6 to 12, or more preferably 7 to 9, for example, using an alkaline agent such as sodium carbonate, sodium hydroxide, potassium hydroxide, and ammonium water. This makes it possible to sufficiently control condensation and curing of the amino resin precursor in the curing process. That is, it is possible to conveniently obtain amino resin particles with uniform properties in every particle and reaction, and with adequate and uniform color, and with an essentially uniform particle size (narrow particle size distribution). Note that, the amount of alkaline agent used is not particularly limited. Further, the method of adding the alkaline agent is not particularly limited, and the alkaline agent can be suitably added in the form of an aqueous solution to the reaction solution.

The reaction solution after addition of the dispersion and after mixed with the dispersion is emulsified to obtain the emulsion. The second coloring process may be provided as required to add a dye to the emulsion. It is preferable that the dye used in the present invention dissolves in water, i.e., water-soluble dye. Specific examples of the water-soluble dye include basic dyes such as rhodamine B, rhodamine 6GCP (provided by Sumitomo Chemical Co., Ltd.), methyl violet FN, and victoria blue FN; and acidic dyes such as Quinoline yellow SS-5G, Quinoline yellow GC (provided by Chuo Synthetic Chemical Co., Ltd.), acid magenta O, methyl violet FB, and victoria blue FB. These dyes may be used individually or in combination of two or more kinds. With the foregoing first coloring process and second coloring process for adding the aqueous dispersion of a dye in the reaction solution, it is possible to obtain amino resin particles which are colored more adequately and more uniformly, i.e., amino resin particles with a more uniform color tone.

The concentration of the dye in the aqueous solution is not particularly limited, and it is preferably in the range of from 0.5 percent by weight to 5 percent by weight, or more preferably 1 percent by weight to 4 percent by weight. A concentration of the dye less than 0.5 percent by weight makes the amount of the aqueous solution added excessive, which may reduce output of the amino resin particles. On the other hand, a concentration of the dye above 5 percent by weight reduces stability of the emulsion, which may result in larger amino resin particles or aggregation of particles. Note that, the method of preparing the aqueous solution of a dye, and the method of adding and mixing the aqueous solution in the emulsion are not particularly limited.

Further, only the second coloring process of the first and second coloring processes may be carried out.

As described, the process for producing amino resin particles according to the present embodiment includes: a reaction process for obtaining a reaction solution containing an amino resin precursor which is obtained by a reaction of an amino compound with formaldehyde, and having a viscosity of $2\times10^{-2}$ Pa·s to $5.8\times10^{-2}$ Pa·s at a temperature of from 95° C. to 98° C.; an emulsion process for obtaining an emulsion by emulsifying the reaction solution; and a curing process for curing the amino resin precursor in an emulsion state by adding a catalyst in the emulsion.

More specifically, the process for producing amino resin particles according to the present embodiment includes: (1) a reaction process for obtaining a reaction solution containing an amino resin precursor which is obtained by a reaction of 1.2 moles to 3.5 moles of formaldehyde with respect to 1 mole of an amino compound, and having a viscosity in a range of from $2\times10^{-2}$ Pa·s to $5.8\times10^{-2}$ Pa·s at a temperature of from 95° C. to 98° C.; (2) an emulsion process for obtaining an emulsion by emulsifying the amino resin precursor; and (3) a curing process for curing the amino resin precursor, by adding a catalyst to the emulsion of the amino resin precursor, so as to promote a dehydration and condensation reaction at methylol groups of the amino resin precursor, wherein the processes of (1) the reaction process, (2) the emulsion process, and (3) the curing process are preferably performed in this order.

Further, it is preferable in the process for producing amino resin particles according to the present embodiment that the amino compound contains at least one compound selected from the group consisting of benzoguanamine, cyclohexane carboguanamine, cyclohexene carboguanamine, and melamin, in an amount of not less than 40 percent by weight with respect to the total amount volume of the amino compound.

Further, it is preferable in the process for producing amino resin particles according to the present embodiment that a proportion of the formaldehyde with respect to 1 mole of the amino compound is 1.2 moles to 3.5 moles.

With this process, it is possible to grasp, in real time monitoring, how far the reaction of the amino compound with formaldehyde in the reaction process has proceeded, and to accurately find the end point of the reaction. That is, by adjusting and controlling the viscosity of the reaction solution within the range of from $2\times10^2$ Pa·s to $5.8\times10^{-2}$ Pa·s (20 c.p. to 58 c.p.), the end point of the reaction between the amino compound and formaldehyde can be accurately found, thereby readily controlling the particle size of the product amino resin particles. As a result, it is possible to conveniently produce amino resin particles with an essentially uniform particle size (narrow particle size distribution). Further, by the essentially uniform particle size, the particles can have the same color tone, for example, when the amino resin particles are colored.

Further, it is preferable that the process for producing amino resin particles according to the present embodiment further includes a coloring process for adding an aqueous dispersion of a dye in the reaction solution.

Further, it is preferable that the process for producing amino resin particles according to the present embodiment further includes a coloring process for adding an aqueous solution of a dye in the emulsion.

With each of these processes, since the dye is added to the reaction solution (emulsion) in the form of an aqueous dispersion (aqueous solution), the dye does not stick to side walls of a reaction vessel (reactor), or a stirrer, stirring blades, or a thermometer, etc. This allows the dye to be uniformly mixed in the reaction solution (emulsion), thus imparting color according to the amount added. In addition, the color does not become different for every particle or reaction. That is, it is possible to readily obtain adequately and evenly colored amino resin particles, i.e., amino resin particles with the same color tone, without variances across particles or reactions.

[Second Embodiment]

The following will describe another embodiment of the present invention. A process for producing amino resin particles (colored resin spherical particles) according to the present embodiment includes: a preparation process for preparing an aqueous dispersion of an inorganic pigment by wet pulverizing the inorganic pigment in an aqueous medium until an average particle size of the inorganic pigment measured by a light scattering method becomes not more than 300 nm; a coloring process for obtaining a colored resin solution by mixing the aqueous dispersion with an amino resin precursor (initial product of the reactions for obtaining the amino resin); a dispersion process for obtaining a colored resin dispersion by emulsifying or suspending the colored resin solution in an aqueous medium; and a curing process for curing the colored resin dispersion by heating the colored resin dispersion to condense.

Note that, for convenience of explanation, the same explanations as already given in the foregoing First Embodiment will not be repeated again.

Examples of devices which can be used to wet pulverize the inorganic pigment include a colloid mill, a disper mill, a homomixer, and a homogenizer. The average particle size of the inorganic pigment obtained by the wet pulverization is measured by a light scattering method. Specifically, the average particle size of the inorganic pigment obtained by the wet pulverization is preferably not more than 300 nm, or more preferably not more than 100 nm. With an average particle size in these ranges, the aqueous dispersion of the inorganic pigment can have good stability. Further, with the use of the aqueous dispersion of the inorganic pigment, amino resin particles with superior coloring strength and superior visibility can be obtained.

An example of a particle size distribution measuring device which can measure average particle size of the inorganic pigment by the light scattering method is the Nicomp 370 (product of PACIFIC SCIENTIFIC Co., Ltd.). This device measures the particle size by adjusting its Nicomp 370 AVG COUNTRATE value in the range of 200 to 600, by diluting a dispersion of the inorganic pigment in water.

The amino resin precursor, which is the initial product of the reactions for producing the amino resin, is the resin which is obtained by the polycondensation reaction of the amino compound with formaldehyde, where the amino compound contains at least one amino group in the molecule. Further, the amino resin precursor may be converted to an ether using an alcohol. Specifically, it is preferable that the amino resin precursor (preliminary condensation product) used in this embodiment is the product of a polycondensation reaction of the amino compound with formaldehyde, where the amino compound contains 40 percent to 100 percent of guanamine, which is at least one of benzoguanamine, cyclohexane carboguanamine, and cyclohexene carboguanamine, or the product which is obtained by etherification of the amino resin precursor prepared by the polycondensation reaction.

It is preferable that the amino resin precursor used in this embodiment has not more than 400 percent miscibility with methanol. As the term is used herein, miscibility with methanol is the measure which is used to indicate a proportion of amino resin precursor condensed by the polycondensation reaction. An example of measuring miscibility with methanol is as follows. First, 2 g of amino resin precursor is dissolved in 5 g of methanol. Then, water is added dropwise to the solution at a temperature of 25° C. to measure the volume of water used to cause the solution to turn turbid. The weight ratio of the water to the amino resin precursor (weight of water/weight of amino resin precursor) is multiplied by 100 to give miscibility with methanol.

The amount of inorganic pigment used can be suitably adjusted in the range of preferably from 1 percent to 30 percent, or more preferably 5 percent to 20 percent of the total weight of the amino compound, formaldehyde, and inorganic pigment. Further, it is preferable that the inorganic pigment is added to an aqueous medium which contains a surfactant in an amount in the range of from 5 percent by weight to 100 percent by weight with respect to the inorganic pigment.

Examples of the surfactant include a nonionic surfactant, anionic surfactant, and cationic surfactant.

Examples of the nonionic surfactant include polyoxyethylene alkyl ether, polyoxyethylene alkyl allyl ether, polyoxyethylene oxypropylene block co-polymer, sorbitan fatty acid ester, polyoxyethylene sorbitan fatty acid ester, polyoxyethylene sorbitol fatty acid ester, glycerine fatty acid ester, polyvinyl alcohol, and polyethylene glycol with the molecular weight of 100 to 2000, or more preferably 300 to 1000. These nonionic surfactants may be used individually or in combination of two or more kinds.

Examples of the anionic surfactant include salts of fatty acids, salts of alkyl sulfate, alkylbenzenesulfonate, alkylbenzenesuccinate, alkyldiphenyletherdisulfonate, polymer surfactants of polycarboxylic acid, polyoxyethylene alkyl phosphoric acid ester. These anionic surfactants may be used individually or in combination of two or more kinds.

Further, examples of the cationic surfactant include alkylamine salts, quaternary ammonium salt alkyl betaine, and amine oxide. These cationic surfactants may be used individually or in combination of two or more kinds.

The nonionic surfactant, anionic surfactant, or cationic surfactant as exemplified above can be added to a dispersion of the inorganic pigment, which is obtained by pulverizing the inorganic pigment in an aqueous medium using a colloid mill, a disper mill, a homomixer, or a homogenizer, etc. In this way, the inorganic pigment can be more uniformly dispersed in the amino resin particles.

The following will describe the dispersion process. The emulsifier may be added, for example, directly to a system which has been prepared by mixing a predetermined amount of inorganic pigment in the amino resin precursor, or may be added by adding a mixture of the amino resin precursor and inorganic pigment to an aqueous solution of the emulsifier which has been separately prepared. The solution of the amino resin precursor and inorganic pigment is stirred using a stirrer, for example, such as a colloid mill, a disper mill, a homomixer, and a homogenizer, which are capable of exerting a strong shearing force to the solution.

The amount of emulsifier added is preferably in the range of from 1 percent to 30 percent, or more preferably 2 percent to 10 percent with respect to the amino resin precursor. The particle size becomes smaller as the amount of emulsifier used is increased, and becomes larger as the amount of emulsifier used is reduced. With the amount of emulsifier less than 1 percent, the emulsion cannot be formed. With the amount of emulsifier above 30 percent, it may become difficult to separate the cured amino resin particles as single particles. Further, the particle size becomes smaller as a stirring efficiency of the stirring device is increased, and becomes larger as a stirring efficiency of the stirring device is reduced. This is because stirring efficiency of the stirring device is related to the shearing force for shearing the amino resin precursor.

It is preferable that the amino resin precursor in the emulsion process has not more than 400 percent, or more preferably, not more than 200 percent miscibility with methanol (index of a proportion of the amino resin precursor condensed by the polycondensation reaction) The particle size can be increased by lowering miscibility with methanol, and can be decreased by increasing miscibility with methanol. With miscibility with methanol larger than 400 percent, the hydrophilicity becomes too strong, which makes it difficult to obtain a simple dispersion of the amino resin particles.

Note that, the degree of condensation of the amino resin precursor can also be managed, in addition to miscibility with methanol, by GPC (Gel Permeation Chromatography), LC (Liquid Chromatography), or miscibility with acetone, etc. Of these methods, miscibility with acetone is preferable in view of such factors as operability and reproducibility. As the term is used herein, miscibility with acetone is the measure which is used to indicate a proportion of the amino resin precursor condensed by the polycondensation reaction. An example of measuring miscibility with acetone is as follows. First, 2 g of amino resin precursor is dissolved in 5 g of acetone. Then, water is added dropwise to the solution at a temperature of 25° C. to measure the volume of water used to cause the solution to turn turbid. The weight ratio of the water to the amino resin precursor (weight of water/weight of amino resin precursor) is multiplied by 100 to give miscibility with acetone. It is preferable that the amino resin precursor has miscibility with acetone in the range of from 50 percent to 500 percent, or more preferably 100 percent to 300 percent. With miscibility with acetone larger than 500 percent, it becomes difficult to obtain particles. With miscibility with acetone below 50 percent, the amino resin particles may not be obtained in spherical form.

The degree of condensation of the amino resin precursor is most preferably managed by the method which measures viscosity of the reaction solution. This is because this method makes it possible to grasp how far the reaction has proceeded and to accurately find the end point of the reaction. A viscosity of the reaction solution containing the amino resin particles in a temperature range of 95° C. to 98° C. is preferably from $2 \times 10^{-2}$ to $5.8 \times 10^{-2}$ Pa·s (20 c.p. to 58 c.p.).

The viscosity can be measured by any method. However, in order to grasp, in real time monitoring, how far the reaction has proceeded, and to accurately find the end point of the reaction, a viscosity measuring device is most suitably be used. A specific example of such a viscosity measuring device is the oscillation viscometer (product of MIVI ITS Japan Co., Ltd., model MIVI 6001). This viscometer is equipped with an oscillator which oscillates in the reaction solution to detect a load which is applied in response to increased viscosity of the reaction solution. The viscometer instantly converts this load to display the current viscosity.

By thus suitably setting various conditions such as the degree of polycondensation of the amino resin precursor, the amount of emulsifier, and stirring efficiency, it is possible to synthesize colored spherical amino resin particles with narrow particle size distribution at a target particle size. Note that, in the present embodiment, the "spherical amino resin particles" are meant to indicate those particles with a particle size ratio (long axis/short axis) in the range of from 1.0 to 1.1, as determined from an image of electron microscopy observing 200 amino resin particles.

The following describes the curing process. The curing catalyst used in the present invention is the catalyst used in the polycondensation reaction of the amino resin precursor. The curing catalyst is used in an amount preferably in the range of from 0.01 percent to 10 percent (0.01 percent to 5 percent when pre-treated carbon black (CB) is used), or more preferably 0.2 percent to 5 percent (0.2 percent to 2 percent when pre-treated CB is used), with respect to a solid component (except the pigment) of the uncured amino resin emulsion which is colored by the inorganic pigment. An excessive amount of the curing catalyst destroys the emulsion state and may form an aggregate. On the other hand, the curing catalyst used in a deficient amount results in incomplete curing and may require a long time to cure the emulsion. The emulsion is cured, for example, for an hour at a temperature of 10° C. to 200° C., followed by heating to a temperature of 40° C. to 200° C. under ordinary pressure or applied pressure. The curing is finished when the product of the curing reaction becomes insoluble in acetone, methanol, methylethylketone, dioxane, dimethylformamide, and the like.

After the curing reaction, the amino resin particles are separated (separation process) for which various separation methods, for example, such as a natural precipitation method, a centrifugal precipitation method, a separation by decantation, and a separation by filtration can be used. The amino resin particles after separation are dispersed in water and various organic solvents. Examples of such organic solvents include, for example, a non-polar solvent such as toluene and xylene, a polar solvent such as methylethyl ketone, methanol, ethanol, isopropyl alcohol, dimethylformamide, and tetrahydrofuran, or a mixture of these different types of solvents. As a result, the amino resin particles can be obtained in the form of a paste or dispersion. After the separation process, the amino resin particles may be dried by conventional methods, such as natural drying, vacuum drying, and heat drying. Further, after the drying process, the amino resin particles may be subjected to heat treatment as required at a temperature of from 100° C. to 200° C. The heat treatment is preferable because it further improves properties of the product amino resin particles, including heat resistance, water resistance, and solvent resistance. However, the heat treatment will not be required when the drying process is carried out at a relatively high temperature, because in this case the drying process also serves as the heat treatment. In addition, in order to obtain the amino resin particles in the form of a fine powder, the amino resin particles may be pulverized after the drying process with such a force that the aggregation of the amino resin particles are broken down, using a pulverizer such as a ball mill, a hummer mill, and a jet mill. Evidently, the amino resin particles after the drying process may be dispersed in a solvent so that the amino resin particles can be obtained in the form of a paste or dispersion.

The amino resin particles of the present embodiment, for example, when produced through the polycondensation reaction in the emulsion state, have an average particle size in the range of from 0.1 μm to 50 μm. However, the average particle size may be outside of this range.

Note that, in the present embodiment, "polycondensation reaction in the emulsion state" is meant to indicate that the polycondensation reaction is carried out in a system where a dispersion medium contains droplets in the form of a dispersion, and therefore it is not just limited to emulsion polymerization but also includes suspension polymerization.

According to the process for producing amino resin particles in accordance with the present embodiment, spherical amino resin particles with narrow particle size distribution and superior color can be obtained ① by wet pulverizing the inorganic pigment in an aqueous medium until the average particle size of the inorganic pigment measured by a light scattering method becomes not more than 300 nm, and ② by adjusting a viscosity of the reaction solution containing the amino resin precursor in the range of from $2\times10^{-2}$ Pa·s to $5.8\times10^{-2}$ Pa·s (20 c.p. to 58 c.p.) at a temperature of from 95° C. to 98° C.

The foregoing process for producing amino resin particles according to the present embodiment has the following advantages over conventional producing processes. (1) The process produces spherical amino resin particles with narrow particle size distribution and with superior color which is imparted by the uniformly dispersed inorganic pigment, without losing superior intrinsic properties of the amino resin, for example, such as heat resistance, solvent resistance, chemicals resistance, and durability. (2) The process produces the amino resin particles by controlling the particle size in the range of from 0.1 μm to 50 μm by the industrially advantageous method.

Further, the amino resin particles obtained by the producing process of the present invention may be used to produce a grain aggregate of amino resin particles by joining the amino resin particles through a binder which contains at least two reactive functional groups in the molecule.

The binder may be of any kind as long as it has at least two reactive functional groups in the molecule. Specifically, such a binder contains at least one reactive functional group which is selected from the group consisting of hydroxide group, carboxyl group, oxazoline group, epoxy group, aziridine group, and isocyanate group.

In this manner, two or more kinds of amino resin particles obtained by the producing process of the present invention may be used to obtain a grain aggregate of fine particles which are joined through a binder which contains at least two of at least one of reactive functional groups which is selected from the group consisting of hydroxide group, carboxyl group, oxazoline group, epoxy group, aziridine group, and isocyanate group. Further, such a grain aggregate comprises two or more kinds of amino resin particles bonded together via a binder, and such a grain aggregate is obtained by spray drying of the amino resin particles dispersion and binder.

Further, specifically, the amino resin particles of the present invention are crosslinked amino resin particles. Additionally, the amino resin particles of the present invention have many desirable properties. The grain aggregate as described above is one example of such desirable properties.

EXAMPLES

The following will describe the present invention in more detail by way of examples and comparative examples. However, the present invention is not limited by the following examples and comparative examples in any ways. Note that, the following Examples 1 through 6 are for the First Embodiment of the present invention, and they should not be regarded as the examples of the present invention. Examples 7 through 11 are for the Second Embodiment of the present invention, and they should not be regarded as the examples of the present invention.

Example 1

To a 10 L reaction vessel equipped with a reflux condenser, a stirrer, a thermometer, and an oscillation viscometer (product of MIVI ITS Japan Co., Ltd., model MIVI 6001), etc., were charged 3000 g (16 moles) of benzoguanamine as the amino compound, 2600 g of 37 weight percent formalin (32 moles of formaldehyde), and 10 g of an aqueous solution containing 10 weight percent sodium carbonate (0.01 mole of sodium carbonate). The whole was heated to 95° C. with stirring to promote reactions. The viscosity of the reaction solution at the start of the reaction at 15° C. (ordinary temperature) was $1.1\times10^{-2}$ Pa·s (11 c.p.).

The reaction solution was cooled to end the reaction process when the viscosity of the reaction solution became $4.5\times10^{-2}$ Pa·s (45 c.p.) (5 hours after the start of the reaction). The product of the reaction process, the reaction solution, contained the amino resin precursor, which is the initial condensation product of the reaction between benzoguanamine and formaldehyde. Table 1 shows a relation between reaction time and viscosity.

TABLE 1

| REACTION TIME | VISCOSITY AT 95° C. ($\times10^{-2}$ Pa · s) |
| --- | --- |
| 0 (START OF REACTION) | 1.1 (AT 15° C.) |
| 30 MINUTES | 1.26 |
| 3 HOURS AND 30 MINUTES | 1.93 |
| 4 HOURS | 2.47 |
| 4 HOURS AND 30 MINUTES | 3.56 |
| 4 HOURS AND 40 MINUTES | 3.95 |
| 4 HOURS AND 50 MINUTES | 4.13 |
| 5 HOURS (END OF REACTION) | 4.5 |

Subsequently, to a 10 L reaction vessel equipped with a reflux condenser, a homomixer (stirrer, provided by Tokushu Kika Kogyo, Co., Ltd.), and a thermometer, etc., were charged an aqueous solution which had been prepared by dissolving 120 g of polyvinyl alcohol (provided by Kuraray Co., Ltd., product name PVA205) in 2050 g of water. The whole was heated to 75° C. with stirring. Then, the reaction solution of the reaction process was added to this reaction vessel and the contents of the reaction vessel were vigorously stirred at 7000 rpm at 77° C., so as to promote emulsification of the amino resin precursor. The result was the emulsion containing 52.5 weight percent of amino resin precursor. The average particle size in the emulsion was measured using a multisizer. The result of measurement showed that the amino resin precursor in the emulsion had the average particle size (d50) of 1.9 μm and the standard deviation 0.72 μm. The emulsion was cooled to 30° C.

Thereafter, to the emulsion was added an aqueous solution which had been prepared by dissolving 40 g of dodecylbenzene sulfonic acid (catalyst) in 1200 g of pure water (the temperature of the solution was maintained at 30° C.). Then, the whole was heated to 90° C. at the rate of 10° C./hr with stirring. Reaching 90° C., the solution was maintained at this temperature for an hour to condense and cure the amino resin precursor. Thus, the total reaction time was 7 hours.

After the curing process, the reaction solution was filtered to remove the amino resin particles according to the present invention. The amino resin particles were then heated for 3 hours at 150° C. and gently pulverized using a mortar and pestle. As a result, the amino resin particles were obtained in white powdery form. The amino resin particles were then measured using a multisizer. The result of measurement showed that the amino resin particles had the average particle size (d50) of 2.01 μm and the standard deviation 0.8 μm. Table 2 shows some of the reaction conditions and the results of the reactions.

Example 2

The same reaction process and emulsion process as those in Example 1 were carried out to obtain an emulsion containing 40 weight percent of amino resin precursor. The amino resin precursor in the emulsion had the average particle size of 4.1 μm and the standard deviation 1.01 μm. This emulsion was used as in Example 1, including the curing process, so as to obtain amino resin particles in the form of a white powder. The amino resin particles had the average particle size of 4.1 μm and the standard deviation 1.1 μm.

Example 3

The same reaction process and emulsion process as those in Example 1 were carried out, except that a dye (provided by Arimoto Chemical Co., Ltd., product name Fluorescent Red 632) was added to the reaction solution in the reaction process, so as to obtain an emulsion containing 40 weight percent of amino resin precursor. The amino resin precursor in the emulsion had the average particle size of 3.9 μm and the standard deviation 0.9 μm. This emulsion was used as in Example 1, including the curing process, to obtain amino resin particles in the form of a pink powder. The amino resin particles had the average particle size of 3.9 μm and the standard deviation 1.02 μm. In addition, the particles had a uniform color tone. Tables 2 shows some of the reaction conditions and the results of the reactions.

Comparative Example 1

This comparative example is the comparative example for Examples 1 through 3 of the present invention, and it should not be regarded as the comparative example of the present invention.

The same reaction process and emulsion process as those in Example 1 were carried out, except that the reaction process was ended when the viscosity of the reaction solution became $6.0 \times 10^{-2}$ Pa·s (60 c.p.), so as to obtain an emulsion containing 52.5 weight percent of amino resin precursor. Thus, the viscosity of the reaction solution did not fall in the preferable range. The amino resin precursor in the emulsion had the average particle size of 5.6 μm and the standard deviation 1.25 μm. This emulsion was used as in Example 1, including the curing process, so as to obtain amino resin particles in the form of a white powder. The amino resin particles of this comparative example had the average particle size of 5.6 μm and the standard deviation 1.27 μm. Thus, the amino resin particles of this comparative example had wide particle size distribution and non-uniform particle size. Table 2 shows some of the reaction conditions and the results of the reactions.

Comparative Example 2

This comparative example is the comparative example for Examples 1 through 3 of the present invention, and it should not be regarded as the comparative example of the present invention.

The same reaction process and emulsion process as those in Example 1 were carried out, except that the reaction process was ended when the viscosity of the reaction solution became $6.5 \times 10^{-2}$ Pa·S (65 c.p.) and the stirring temperature of the emulsion process was 65° C., so as to obtain an emulsion containing 52.5 weight percent of amino resin precursor. Thus, the viscosity of the reaction solution did not fall in the preferable range. The amino resin precursor in the emulsion had the average particle size of 6.8 μm and the standard deviation 1.31 μm. This emulsion was used as in Example 1, including the curing process, to obtain amino resin particles in the form of a white powder. The amino resin particles of this comparative example had the average particle size of 6.8 μm and the standard deviation 1.34 μm. Thus, the amino resin particles of this comparative example had wide particle size distribution and non-uniform particle size. Table 2 shows some of the reaction conditions and the results of the reactions.

Comparative Example 3

This comparative example is the comparative example for Examples 1 through 3 of the present invention, and it should not be regarded as the comparative example of the present invention.

The same reaction process and emulsion process as those in Example 1 were carried out, except that a dye (provided by Arimoto Chemical Co., Ltd., product name Fluorescent Red 600) was added to the reaction solution in the reaction process and the reaction process was ended when the viscosity of the reaction solution became $1.0 \times 10^{-2}$ Pa·S (10 c.p.), so as to obtain an emulsion containing 40 weight percent of amino resin precursor. Thus, the viscosity of the reaction solution did not fall in the preferable range. The amino resin precursor in the emulsion had the average particle size of 8.1 μm and the standard deviation 1.24 μm. This emulsion was used as in Example 1, including the curing process, to obtain amino resin particles in the form of a pink powder. The amino resin particles of this comparative example had the average particle size of 8.1 μm and the standard deviation 1.51 μm. Thus, the amino resin particles of this comparative example had wide particle size distribution and non-uniform particle size. In addition, each particle had a different color tone. Table 2 shows some of the reaction conditions and the results of the reactions.

|  |  | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 |
|---|---|---|---|---|---|---|---|
| REACTION PROCESS | REACTION TEMPERATURE (° C.) | 95 | 96 | 96 | 95 | 95 | 95 |
|  | VISCOSITY ($\times 10^{-2}$ Pa·s) | 4.5 | 5.5 | 5.0 | 6.0 | 6.5 | 1.0 |
| EMULSION PROCESS | PVA (PHBG) | 4 | 3 | 4 | 4 | 4 | 4 |
|  | STIRRING TEMPERATURE (° C.) | 78 | 75 | 80 | 78 | 65 | 80 |

-continued

|  |  | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 |
|---|---|---|---|---|---|---|---|
|  | CONCENTRATION (WEIGHT %) | 52.5 | 40 | 40 | 52.5 | 52.5 | 40 |
|  | AVERAGE PARTICLE SIZE (d50) ($\mu$m) | 1.9 | 4.1 | 3.9 | 5.6 | 6.8 | 8.1 |
|  | STANDARD DEVIATION ($\mu$m) | 0.72 | 1.01 | 0.9 | 1.25 | 1.31 | 1.24 |
| AMINO RESIN PARTICLES | AVERAGE PARTICLE SIZE (d50) ($\mu$m) | 2.01 | 4.1 | 3.9 | 5.6 | 6.8 | 8.1 |
|  | STANDARD DEVIATION ($\mu$m) | 0.8 | 1.1 | 1.02 | 1.27 | 1.34 | 1.51 |

Example 4

To a 10 L reaction vessel equipped with a ref lux condenser, a stirrer, a thermometer, and an oscillation viscometer (the same as above), etc., were charged 3200 g (17.1 moles) of benzoguanamine as the amino compound, 2810 g of 37 weight percent formalin (34.7 moles of formaldehyde), and 10 g of an aqueous solution containing 10 weight percent of sodium carbonate (0.01 mole of sodium carbonate). The whole was heated to 95° C. with stirring to promote reactions.

The reaction solution was cooled to end the reaction process when the viscosity of the reaction solution became $4.0 \times 10^{-2}$ Pa·s (40 c.p.). Separately, a dispersion was prepared by adding and sufficiently dispersing 50 g of a solvent-soluble dye (provided by Arimoto Chemical Co., Ltd., product name Fluorescent Red 632) in an aqueous solution which had been prepared by dissolving 0.5 g of a dispersion auxiliary (provided by Kao Corporation, product name Emulgen 920) in 70 g of pure water. The dispersion so prepared was added to the reaction solution. The result was a colored reaction solution containing the amino resin precursor, which is the initial condensation product of the reaction of benzoguanamine with formaldehyde.

Thereafter, to a 10 L reaction vessel equipped with a reflux condenser, a homomixer (the same as above), and a thermometer, etc., was charged an aqueous solution which had been prepared by dissolving 100 g of polyvinyl alcohol (provided by Kuraray Co., Ltd., product name PVA205) as an emulsifier in 5150 g of water. The whole was heated to 75° C. with stirring. The reaction solution was then added to this reaction vessel and the contents of the reaction vessel were vigorously stirred at 7000 rpm at 77° C., so as to promote emulsification of the amino resin precursor. The result was a pink emulsion containing 38.3 weight percent of amino resin precursor. The average particle size in the emulsion was measured using a multisizer. The result of measurement showed that the amino resin precursor in the emulsion had the average particle size (d50) of 3.5 $\mu$m and the standard deviation 0.62 $\mu$m. The emulsion was cooled to 30° C.

Thereafter, 7 g of a water-soluble dye, acid red 52, was dissolved in 650 g of pure water to prepare an aqueous solution. The aqueous solution so prepared was added to the emulsion and the whole was stirred for 5 minutes. To the emulsion was added an aqueous solution which had been prepared by dissolving 40 g of dodecylbenzene sulfonic acid (catalyst) in 1200 g of pure water (the temperature of the contents was maintained at 30° C.). Then, the whole was heated to 90° C. at the rate of 10° C./hr with stirring. Reaching 90° C., the solution was maintained at this temperature for an hour to allow the amino resin precursor to condense and cure. Thus, the total reaction time was 7 hours.

After the curing process, the reaction solution was filtered to remove the colored amino resin particles according to the present invention. The amino resin particles were then heated for 3 hours at 150° C. and gently pulverized using a mortar and pestle. As a result, amino resin particles in red powdery form were obtained. The amino resin particles were measured using a multisizer. The result of measurement showed that the amino resin particles had the average particle size (d50) of 3.7 $\mu$m and the standard deviation 0.99 $\mu$m. Table 3 shows some of the reaction conditions and the results of the reactions.

Example 5

A dispersion was prepared by adding and sufficiently dispersing 50 g of a solvent-soluble dye (provided by Arimoto Chemical Co., Ltd., product name Fluorescent yellow 600) in an aqueous solution which had been prepared by dissolving 0.5 g of a dispersion auxiliary (provided by Kao Corporation, product name Emulgen 920) in 100 g of pure water. Then, the same reaction process, coloring process, and emulsion process as those in Example 4 were carried out, except that the dispersion was added to the reaction solution in the coloring process. The result was an yellow emulsion containing 38.3 weight percent of amino resin precursor. The average particle size of the amino resin precursor in the emulsion was 4.0 $\mu$m, and the standard deviation was 0.71 $\mu$m. This emulsion was used as in Example 4, including the curing process, to obtain amino resin particles in the form of an yellow powder. The amino resin particles had the average particle size of 4.1 $\mu$m and the standard deviation 0.88 $\mu$m. Table 3 shows some of the reaction conditions and the results of the reactions.

TABLE 3

| | | EXAMPLE 4 | EXAMPLE 5 |
|---|---|---|---|
| REACTION PROCESS | REACTION TEMPERATURE (° C.) | 95 | 95 |
| | VISCOSITY (×10$^{-2}$ Pa · s) | 4.0 | 4.5 |
| COLORING PROCESS | SOLVENT-SOLUBLE DYE (g) | 50 | 50 |
| | PURE WATER (g) | 70 | 100 |
| | CONCENTRATION (WEIGHT %) | 41.5 | 33.2 |
| EMULSION PROCESS | PVA (g/100 g BENZOGUANAMINE) | 3 | 3 |
| | STIRRING TEMPERATURE (° C.) | 77 | 75 |
| | CONCENTRATION (WEIGHT %) | 38.3 | 38.3 |
| | AVERAGE PARTICLE SIZE (d50) (μm) | 3.5 | 4.0 |
| | STANDARD DEVIATION (μm) | 0.62 | 0.71 |
| SECOND COLORING PROCESS | WATER-SOLUBLE DYE (g) | 7 | |
| | PURE WATER (g) | 650 | |
| | CONCENTRATION (WEIGHT %) | 1.1 | |
| AMINO RESIN PARTICLES | AVERAGE PARTICLE SIZE (d50) (μm) | 3.7 | 4.1 |
| | STANDARD DEVIATION (μm) | 0.99 | 0.88 |

Example 6

To a 10 L reaction vessel equipped with a reflux condenser, a stirrer, a thermometer, and an oscillation viscometer (the same as above), etc., were charged 3200 g of benzoguanamine (17.1 moles) as the amino compound, 2810 g of 37 weight percent formalin (34.7 moles of formaldehyde), and 10 g of an aqueous solution containing 10 percent by weight of sodium carbonate (0.01 mole of sodium carbonate). The whole was heated to 96° C. with stirring to promote reactions.

The reaction solution was cooled to end the reaction process when the viscosity of the reaction solution became 4.5×10$^{-2}$ Pa·s (45 c.p.). The result was a reaction solution containing an amino resin precursor, which is the initial condensation product of the reaction of benzoguanamine with formaldehyde.

Thereafter, to a 10 L reaction vessel equipped with a reflux condenser, a homomixer (the same as above), and a thermometer, etc., was charged an aqueous solution which had been prepared by dissolving 100 g of polyvinyl alcohol (provided by Kuraray Co., Ltd., product name PVA205) as an emulsifier in 5150 g of water. The whole was heated to 75° C. with stirring. The reaction solution was then added to this reaction vessel and the contents of the reaction vessel were vigorously stirred at 7000 rpm at 75° C., so as to promote emulsification of the amino resin precursor. The result was the emulsion containing 38.3 weight percent of amino resin precursor. The average particle size in the emulsion was measured using a multisizer. The result of measurement showed that the amino resin precursor in the emulsion had the average particle size (d50) of 3.8 μm and the standard deviation 0.93 μm. The emulsion was cooled to 30° C.

Thereafter, 7 g of a water-soluble dye, acid red 52, was dissolved in 350 g of pure water to prepare an aqueous solution. The concentration of the dye was about 2 percent by weight. The aqueous solution thus prepared was added to the emulsion and the whole was stirred for 5 minutes. To the emulsion was added an aqueous solution which had been prepared by dissolving 40 g of dodecylbenzene sulfonic acid (catalyst) in 1200 g of pure water (the temperature of the contents was maintained at 30° C.). Then, the whole was heated to 90° C. at the rate of 10° C./hr with stirring. Reaching 90° C., the solution was maintained at this temperature for an hour to allow the amino resin precursor to condense and cure. Thus, the total reaction time was 7 hours.

After the curing process, the reaction solution was filtered to remove the colored amino resin particles according to the present invention. The amino resin particles were then heated for 3 hours at 150° C. and gently pulverized using a mortar and pestle. As a result, amino resin particles in pink powdery form were obtained. The amino resin particles were measured using a multisizer. The result of measurement showed that the amino resin particles had the average particle size (d50) of 3.9 μm and the standard deviation 1.05 μm. Table 4 shows some of the reaction conditions and the results of the reactions.

Example 7

The same reaction process and emulsion process as those in Example 6 were carried out. The result was a white emulsion containing 38.3 percent by weight of amino resin precursor. The average particle size of the amino resin precursor in the emulsion was 3.8 μm, and the standard deviation was 0.90 μm.

Thereafter, 7 g of a water-soluble dye, acid red 52, was dissolved in 150 g of pure water to prepare an aqueous solution. The concentration of the dye was about 4.5 percent by weight. Then, by the processes of Example 6, including the curing process, amino resin particles in the form of a pink powder were obtained. The amino resin particles had the average particle size (d50) of 5.0 μm and the standard deviation 1.21 μm. Table 4 shows some of the reaction conditions and the results of the reactions.

TABLE 4

| | | EXAMPLE 6 | EXAMPLE 7 |
|---|---|---|---|
| REACTION PROCESS | REACTION TEMPERATURE (° C.) | 96 | 96 |
| | VISCOSITY (×10$^{-2}$ Pa · s) | 4.5 | 4.5 |

TABLE 4-continued

|  |  | EXAMPLE 6 | EXAMPLE 7 |
|---|---|---|---|
| EMULSION PROCESS | PVA (g/100 g BENZOGUANAMINE) | 3 | 3 |
|  | STIRRING TEMPERATURE (° C.) | 75 | 75 |
|  | CONCENTRATION (WEIGHT %) | 38.3 | 38.3 |
|  | AVERAGE PARTICLE SIZE (d50) (μm) | 3.8 | 3.8 |
|  | STANDARD DEVIATION (μm) | 0.93 | 0.90 |
| COLORING PROCESS | WATER-SOLUBLE DYE (g) | 7 | 7 |
|  | PURE WATER (g) | 350 | 150 |
|  | CONCENTRATION (WEIGHT %) | 2.0 | 4.5 |
| AMINO RESIN PARTICLES | AVERAGE PARTICLE SIZE (d50) (μm) | 3.9 | 5.0 |
|  | STANDARD DEVIATION (μm) | 1.05 | 1.21 |

Example 8

To a 1 L beaker were added 100 g of carbon (provided by Mitsubishi Chemical Industries Ltd., MA600), 15 g of Emulgen 920 (provided by Kao Corporation), and 385 g of pure water. The whole was pulverized and dispersed for 10 minutes at 5000 rpm using a homomixer (provided by Tokushu Kika Kogyo, Type M), so as to prepare a carbon dispersion. The particle size of the dispersion was measured using Nicomp 370. The result of measurement showed that the carbon dispersion had a desirable average particle size of 190 nm.

Thereafter, to a flask equipped with a stirrer, a reflux condenser, and a thermometer were charged 150 g of benzoguanamine (0.8 mole), 162 g of 37 percent formalin (2.0 moles of formaldehyde), and 0.65 g of a 10 percent sodium carbonate aqueous solution. The whole was allowed to react for 5 hours at 94° C. to 95° C. with stirring. The initial product was the amino resin precursor with 60% miscibility with methanol and 250% miscibility with acetone. To this amino resin precursor was added 75 g of carbon dispersion, and the mixture was stirred for 30 minutes. The result was a carbon-colored amino resin precursor. Separately, an aqueous solution was prepared by dissolving 10.5 g of PVA 205 (partial hydrolyzed product of polyvinyl alcohol, provided by Kuraray Co., Ltd.) in 145 g of water. After increasing the temperature to 90° C., the aqueous solution was stirred at 6000 rpm using a homomixer (provided by Tokushu Kika Kogyo Co., Ltd.). The black amino resin precursor was then added to the PVA 205 aqueous solution being stirred. The result was a black emulsion. The emulsion thus obtained was cooled to 40° C. and 4.5 g of dodecylbenzene sulfonic acid was added thereto. The whole was then gradually heated and stirred for 2 hours at each temperature of 50° C., 70° C., and 80° C. The result was a suspension of the colored amino resin particles which were cured by the polycondensation reaction in the emulsion state. The suspension, observed under a light microscope (×600), contained spherical fine particles with a particle size of about 4 μm. The amino resin particles were filtered from the suspension and water washed. The amino resin particles were then dried for 1 hour at 100° C. and heated for 3 hours at 100° C. The product was gently pulverized using a mortar. The result was powdery amino resin particles with brilliant black. The amino resin particles so obtained had a particle size ratio (long axis/short axis) of 1.05, as determined from an image of electron microscopy using a scanning electron microscope (provided by Hitachi, Ltd., model S-570), observing 200 amino resin particles. In addition, the product particles were dispersed in epoxy resin and cured therein. Using Ultrotome V (provided by LKB Co., Ltd., KLB 2088), the resin was sliced and the sliced surface was observed with a transmission microscope, which showed uniform dispersion of carbon in the particles.

Further, a Coulter counter (provided by Coulter, multisizer type) was used to measure particle size of the amino resin particles. The measurement showed that the amino resin particles had the average particle size of 4.25 μm and very sharp particle size distribution. Further, the coloring strength, heat resistance, dispersibility, and water resistance of the amino resin particles were measured in the following manner. The amino resin particles were found to be black resin spherical fine particles with superior quality in coloring strength, heat resistance, and dispersibility. The results are shown in Table 5.

Example 9

To a four-neck flask equipped with a stirrer, a reflux condenser, and a thermometer were charged 187 g (1.0 mole) of benzoguanamine, 25 g (0.2 mole) of melamin, 243 g of 37 percent formalin (3.0 moles of formaldehyde), and 0.95 g of a 10 percent sodium carbonate aqueous solution. The whole was allowed to react for 3 hours and 30 minutes at 94° C. to 95° C. with stirring. The initial product was the amino resin precursor with 60% miscibility with methanol and 250% miscibility with acetone. To this amino resin precursor was added 100 g of the carbon dispersion obtained in Example 1, and the mixture was stirred for 30 minutes. The result was a carbon-colored black amino resin precursor. Separately, an aqueous solution was prepared by dissolving 15.9 g of PVA 205 (partial hydrolyzed product of polyvinyl alcohol, provided by Kuraray Co., Ltd.) in 183 g of water. After increasing the temperature to 90° C., the aqueous solution was stirred at 6000 rpm using a homomixer (provided by Tokushu Kika Kogyo Co., Ltd., Type HW-M).

The black amino resin precursor was then added to the PVA 205 aqueous solution being stirred. The result was a black emulsion. The emulsion thus obtained was cooled to 40° C. and 4.62 g of dodecylbenzene sulfonic acid was added thereto. The whole was then gradually heated and stirred for 2 hours at each temperature of 50° C., 70° C., and 90° C. The result was a suspension of the black amino resin particles which were cured by the polycondensation reaction in the emulsion state. The suspension, observed under a light microscope (×600), contained spherical fine particles with a particle size of about 5 μm. The black amino resin particles were filtered from the suspension and water washed. The amino resin particles were then dried for 1 hour at 100° C. and heated for 5 hours at 130° C. The product was gently pulverized using a mortar. The result was powdery black amino resin particles with brilliant black.

The amino resin particles so obtained had a particle size ratio (long axis/short axis) of 1.04, as determined from an image of electron microscopy using a scanning electron microscope (provided by Hitachi, Ltd., model S-570), observing 200 amino resin particles. In addition, the product particles were dispersed in epoxy resin and cured therein. Using Ultrotome V, the resin was sliced and the sliced surface was observed with a transmission microscope, which showed uniform dispersion of carbon in the particles.

Further, a Coulter counter was used to measure particle size of the black amino resin particles. The measurement showed that the amino resin particles had the average particle size of 5.05 μm and very sharp particle size distribution. Further, properties of the amino resin particles, such as coloring strength and heat resistance were measured in the foregoing manner. The amino resin particles were found to be black resin spherical fine particles with superior properties, including coloring strength and heat resistance.

Example 10

To a 1 L beaker were added 100 g of carbon (provided by Mitsubishi Chemical Industries Ltd., MA600), 15 g of Emulgen 920 (provided by Kao Corporation), 85 g of polyethylene glycol (provided by Kanto Chemical Co., Ltd., product name MW:600), and 300 g of pure water. The whole was pulverized and dispersed for 10 minutes at 5000 rpm using a homomixer (provided by Tokushu Kika Kogyo Co., Ltd., Type M), so as to prepare a carbon dispersion. The particle size of the dispersion was measured using Nicomp 370. The result of measurement showed that the carbon dispersion had a desirable average particle size of 175 nm.

Thereafter, to a flask equipped with a stirrer, a reflux condenser, and a thermometer were charged 150 g (0.8 mole) of benzoguanamine, 162 g of 37 percent formalin (2.0 moles of formaldehyde), and 0.65 g of a 10 percent sodium carbonate aqueous solution. The whole was allowed to react for 5 hours at 94° C. to 95° C. with stirring. The initial product was the amino resin precursor with 60% miscibility with methanol and 250% miscibility with acetone. To this amino resin precursor was added 75 g of carbon dispersion, and the mixture was stirred for 30 minutes. The result was a carbon-colored amino resin precursor. Separately, an aqueous solution was prepared by dissolving 10.5 g of PVA 205 (partial hydrolyzed product of polyvinyl alcohol, provided by Kuraray Co., Ltd.) in 100 g of water. After increasing the temperature to 90° C., the aqueous solution was stirred at 6000 rpm using a homomixer (provided by Tokushu Kika Kogyo, Type M). The black amino resin precursor was then added to the PVA 205 aqueous solution being stirred. The result was a black emulsion. The emulsion so obtained was cooled to 40° C. and 4.5 g of dodecylbenzene sulfonic acid was added thereto. The whole was then gradually heated and stirred for 2 hours at each temperature of 50° C., 70° C., and 80° C. The result was a suspension of the colored amino resin particles which were cured by the polycondensation reaction in the emulsion state. The suspension, observed under a light microscope (×600), contained spherical fine particles with a particle size of about 4 μm. The amino resin particles were filtered from the suspension and water washed. The amino resin particles were then dried for 1 hour at 100° C. and heated for 3 hours at 100° C. The product was gently pulverized using a mortar. The result was powdery black amino resin particles with brilliant black. The amino resin particles so obtained had a particle size ratio (long axis/short axis) of 1.04, as determined from an image of electron microscopy using a scanning electron microscope (provided by Hitachi, Ltd., model S-570), observing 200 amino resin particles. In addition, the product particles were dispersed in epoxy resin and cured therein. Using Ultrotome V, the resin was sliced and the sliced surface was observed using a transmission microscope, which showed uniform dispersion of carbon in the particles.

Further, a Coulter counter (the same as above) was used to measure particle size of the amino resin particles. The measurement showed that the amino resin particles had the average particle size of 3.83 μm and very sharp particle size distribution. Also, the coloring strength, heat resistance, dispersibility, and water resistance of the amino resin particles were measured in the following manner. The amino resin particles were found to be black resin spherical fine particles with superior quality in coloring strength, heat resistance, and dispersibility. The results are shown in Table 5.

Example 11

The method of Example 8 was used to prepare titanium oxide amino resin particles, using a dispersion of titanium oxide (average particle size of 87 nm), which was prepared by using titanium oxide provided by Fuji Titanium Industry Co., Ltd., product name TA-100), instead of the carbon aqueous dispersion of Example 8.

The amino resin particles had the average particle size of 5.11 μm (Coulter counter value), and was in the form of white spherical fine particles with superior properties in coloring strength, heat resistance, dispersibility, and water resistance, as in Example 8.

In addition, the product particles were dispersed in epoxy resin and cured therein. Using Ultrotome V, the resin was sliced and the sliced surface was observed using a transmission microscope, which showed uniform dispersion of carbon in the particles.

Example 12

Powdery black amino resin particles were obtained by the same method as that in Example 8, except that the reaction for obtaining the amino resin precursor was performed until viscosity of the reaction solution as measured by the oscillation viscometer (the same as above) became $3.5 \times 10^{-2}$ Pa·s at 95° C. (4.75 hours from the start of the reaction).

The amino resin particles so obtained had a particle size ratio (long axis/short axis) of 1.04, as determined from an image of electron microscopy using a scanning electron microscope (provided by Hitachi, Ltd., model S-570), observing 200 amino resin particles. In addition, the product particles were dispersed in epoxy resin and cured therein. Using Ultrotome V, the resin was sliced and the sliced surface was observed using a transmission microscope, which showed uniform dispersion of carbon in the particles.

Further, a Coulter counter was used to measure particle size of the black amino resin particles. The measurement showed that the amino resin particles had the average particle size of 3.75 μm and very sharp particle size distribution. In addition, properties of the amino resin particles, such as coloring strength, heat resistance, dispersibility, and water resistance, were measured in the foregoing manner. As a result, the amino resin particles were found to be black spherical fine particles with superior properties in coloring strength, heat resistance, and dispersibility. The results are shown in FIG. 5. In addition, in order to check reproducibility of the reaction for obtaining the amino resin precursor, the reaction was repeated under the same conditions. The result was very accurate reproduction of the reaction, which was made possible by the viscosity measurement to find the end point of the reaction for obtaining the amino resin precursor.

Comparative Example 4

This comparative example is the comparative example for Examples 8 through 11 of the present invention, and it should not be regarded as the comparative example of the present invention.

Powdery black amino resin particles were obtained as in Example 8, except that 30 g of carbon (provided by Mitsubishi Chemical Industries Ltd., MA600) was added without wet-pulverization. The suspension of the amino resin particles, observed under a light microscope (×600), contained spherical fine particles with a particle size of about 10 µm.

The amino resin particles so obtained had a particle size ratio (long axis/short axis) of 1.3, as determined from an image of electron microscopy using a scanning electron microscope (provided by Hitachi, Ltd., model S-570), observing 200 amino resin particles. In addition, the product particles were dispersed in epoxy resin and cured therein. Using Ultrotome V, the resin was sliced and the sliced surface was observed with a transmission microscope, which showed non-uniform dispersion of carbon in the particles and a large number of particles without carbon. Further, a Coulter counter (provided by Coulter, multisizer type) was used to measure particle size of the amino resin particles. The measurement showed that the amino resin particles had the average particle size of 15.17 µm and broad particle size distribution.

Comparative Example 5

This comparative example is the comparative example for Examples 8 through 11 of the present invention, and it should not be regarded as the comparative example of the present invention.

Powdery amino resin particles with brilliant black were obtained as in Example 11, except that 30 g of titanium oxide (provided by Fuji Titanium Industry Co., Ltd., product name TA-100) was added without wet-pulverization. The suspension of the amino resin particles, observed under a light microscope (x 600), contained spherical fine particles with the particle size of about 10 µm.

The amino resin particles so obtained had a particle size ratio (long axis/short axis) of 1.04, as determined from an image of electron microscopy using a scanning electron microscope (provided by Hitachi, Ltd., model S-570), observing 200 amino resin particles. In addition, the product particles were dispersed in epoxy resin and cured therein. Using Ultrotome V, the resin was sliced and the sliced surface was observed with a transmission microscope, which showed non-uniform dispersion of titanium oxide in the particles and a large number of particles without titanium oxide. Further, a Coulter counter (provided by Coulter, multisizer type) was used to measure particle size of the amino resin particles. The measurement showed that the amino resin particles had the average particle size of 11.35 µm and broad particle size distribution.

Comparative Example 6

This comparative example is the comparative example for Examples 8 through 11 of the present invention, and it should not be regarded as the comparative example of the present invention.

To a flask equipped with a stirrer, a reflux condenser, and a thermometer were charged 2 g of acrylic acid, 240 g of methylmethacrylate, 29 g of divinylbenzene, 50 g of styrene resin, 1 g of azobis (isobutylonitrile), and 25 g of carbon (provided by Mitsubishi Chemical Industries Ltd., MA600) without wet-pulverization. The whole was sufficiently stirred to attain a uniform mixture. The result was a black solution. Separately, an aqueous solution which had been prepared by dissolving 17 g of PVA 205 (the same as above) in 600 g of water was stirred using a homomixer (the same as above) at 6000 rpm in the atmosphere of nitrogen. The black solution was then added to the PVA 205 aqueous solution and temperature thereof was increased to 80° C. After 30 minutes, the solution was transferred to a four-neck flask and was stirred therein at the maintained temperature of 80° C. in the atmosphere of nitrogen, so as to facilitate the reaction for 5 hours. The result was a suspension of cured black resin. The suspension, observed under a light microscope (×600), contained spherical fine particles with the particle size of about 6 µm. The amino resin particles were filtered from the suspension and water washed. The amino resin particles were then dried at 100° C. and pulverized using a mortar. The result was powdery black amino resin particles. The amino resin particles so obtained had a particle size ratio (long axis/short axis) of 1.12, as determined from an image of electron microscopy using a scanning electron microscope (provided by Hitachi, Ltd., model S-570), observing 200 amino resin particles. In addition, non-particulate carbon was also observed.

In order to examine Hunter whiteness and coloring strength of the amino resin particles obtained in Examples 8 through 12 and Comparative Examples 4 through 6, the particles were tested and compared through PP (polypropylene resin) coloring and coat coloring.

<Hunter whiteness>

The product amino resin particles were measured using a chromoscope (provided by Nippon Denshoku Co., Ltd., product name Σ80).

<PP coloring>

1 part of the product colored amino resin particles (pigment) was mixed with 100 parts of polypropylene resin (provided by Chisso Corporation, product name K-1014) The mixture was heated to form a color plate by injection molding at 250° C. The following criteria were used to evaluate the color plate using a chromoscope (the same as above).

| | Evaluation Criteria | |
|---|---|---|
| | Blackness | Whiteness |
| ○: | 2.4 or below | 90 or above |
| Δ: | 2.5 to 3.0 | 87 to 90 |
| X: | 3.1 or above | 86 or below |

<Coat Coloring>

To 100 parts of acrylic resin (provided by Nippon Shokubai Co., Ltd., product name ACRYSET 5227) were added 40 parts of the colored amino resin particles (pigment), 100 parts of toluene, and 60 parts of ethyl acetate. The whole was mixed for 2 minutes at 3000 rpm using a homodisper (provided by Tokushu Kika Kogyo Co., Ltd., Type M). The mixture was then applied over Boron-Kent paper using a barcoater No. 20. After dried at 80° C. using a hot-heat drier, the color was evaluated by the following criteria using a chromoscope (the same as above).

Evaluation Criteria

|  | Blackness | Whiteness |
|---|---|---|
| ○: | 2.4 or below | 90 or above |
| Δ: | 2.5 to 3.0 | 87 to 90 |
| X: | 3.1 or above | 86 or below |

The results of evaluation are shown in Table 5 and Table 6.

TABLE 5

|  | EXAMPLE 8 | EXAMPLE 9 | EXAMPLE 10 | EXAMPLE 12 | COMPARATIVE EXAMPLE 4 | COMPARATIVE EXAMPLE 6 |
|---|---|---|---|---|---|---|
| COLOR | BLACK | BLACK | BLACK | BLACK | BLACK | BLACK |
| HUNTER WHITENESS (%) | 2.1 | 1.9 | 1.85 | 2.5 | 3.5 | 2.5 |
| PARTICLE SIZE (μm) | 4.25 | 5.05 | 3.83 | 6.23 | 15.17 | 6.23 |
| PP COLORING STRENGTH | ○ | ○ | ○ | ○ | X | Δ |
| COAT COLORING STRENGTH | ○ | ○ | ○ | ○ | X | Δ |

TABLE 6

|  | EXAMPLE 11 | COMPARATIVE EXAMPLE 5 |
|---|---|---|
| COLOR | WHITE | WHITE |
| HUNTER WHITENESS (%) | 92 | 85 |
| PARTICLE SIZE (μm) | 5.11 | 11.35 |
| PP COLORING STRENGTH | ○ | x |
| COAT COLORING STRENGTH | ○ | x |

As these results show, the coloring strength can be improved when the inorganic pigment is wet-pulverized and mixed with the amino resin precursor.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A process for producing amino resin particles, comprising:

a reaction process for obtaining a reaction solution containing an amino resin precursor which is obtained by a reaction of 1.2 moles to 3.5 moles of formaldehyde with 1 mole of an amino compounds, and having a viscosity in a range of from $2 \times 10^{-2}$ Pa·s to $5.8 \times 10^{-2}$ Pa·s at a temperature in a range of from 95° C. to 98° C., the viscosity being measured by a viscosity measuring device;

an emulsion process for emulsifying the reaction solution containing the amino resin precursor so as to obtain an emulsion of the amino resin precursor; and a curing process for curing the amino resin precursor in the emulsion state, by adding a catalyst to the emulsion of the amino resin precursor, to promote a dehydration and condensation reaction at methylol groups of the amino resin precursor.

2. The process for producing amino resin particles according to claim 1, wherein the amino compound contains at least one compound selected from the group consisting of benzoguanamine, cyclohexane carboguanamine, cyclohexene carboguanamine, and melamin, in an amount of not less than 40 percent by weight with respect to the total amount volume of the amino compound.

3. The process for producing amino resin particles according to claim 1, wherein, in said reaction process, when an inorganic pigment is used, the amino resin precursor which is obtained by the reaction of the amino compound and the formaldehyde is mixed with an aqueous dispersion of an inorganic pigment which is obtained by wet pulverizing the inorganic pigment in an aqueous medium until an average particle size of the inorganic pigment measured by a light scattering method becomes not more than 300 nm.

4. The process for producing amino resin particles according to claim 3, wherein the aqueous medium contains a surfactant.

5. The process for producing amino resin particles according to claim 4, wherein the surfactant is an nonionic surfactant.

6. The process for producing amino resin particles according to claim 1, wherein said emulsion process uses 1 percent by weight to 30 percent by weight of an emulsifier, with respect to the amino resin precursor.

7. The process for producing amino resin particles according to claim 1, further comprising, before said emulsion process, a coloring process for adding an aqueous dispersion of a dye in the reaction solution.

8. The process for producing amino resin particles according to claim 7, wherein the aqueous dispersion contains the dye in an amount of from 1 percent by weight to 50 percent by weight with respect to the aqueous dispersion.

9. The process for producing amino resin particles according to claim 1, further comprising, after said emulsion process, a coloring process for adding an aqueous solution of a dye in the emulsion.

10. The process for producing amino resin particles according to claim 9, wherein the aqueous solution contains the dye in a concentration of from 0.1 percent by weight to 5 percent by weight with respect to the aqueous solution.

11. A process for producing colored amino resin particles, comprising:

a preparation process for preparing an aqueous dispersion of an inorganic pigment by wet pulverizing the inorganic pigment in an aqueous medium until an average particle size of the inorganic pigment measured by a light scattering method becomes not more than 300 nm;

a coloring process for obtaining a colored amino resin solution by mixing the aqueous dispersion with an amino resin precursor which is obtained by a reaction of an amino compound with formaldehyde;

a dispersion process for obtaining a colored amino resin dispersion by emulsifying or suspending the colored amino resin solution in the aqueous medium; and a curing process for curing the colored amino resin dispersion by adding a catalyst and heating the colored amino resin dispersion, so as to promote a dehydration and condensation reaction at methylol groups of the colored amino resin.

12. The process for producing amino resin particles according to claim 11, wherein, in said coloring process, the amino resin precursor is obtained by a reaction of 1.2 moles to 3.5 moles of formaldehyde with respect to 1 mole of the amino compound.

13. The process for producing amino resin particles according to claim 11, further comprising, after said curing process, a separation process for separating the cured colored amino resin particles from the dispersion of cured colored amino resin.

14. The process for producing amino resin particles according to claim 11, wherein the aqueous medium contains a surfactant.

15. The process for producing amino resin particles according to claim 14, wherein the surfactant is an nonionic surfactant.

16. The process for producing amino resin particles according to claim 11, wherein the amino resin precursor is obtained by a reaction of formaldehyde with an amino compound which contains at least one compound selected from the group consisting of benzoguanamine, cyclohexane carboguanamine, cyclohexene carboguanaminc, and melamin, in an amount of 40 percent by weight to 100 percent by weight with respect to the total amount volume of the amino compound.

17. The process for producing amino resin particles according to claim 11, wherein the emulsifier is used in an amount of from 1 percent by weight to 30 percent by weight with respect to the amino resin precursor.

* * * * *